E. B. HULSEY & J. A. D. HERRINGTON.
STOP MOTION FOR MOTION PICTURE MACHINES.
APPLICATION FILED JUNE 1, 1916.
1,243,067.
Patented Oct. 16, 1917.
3 SHEETS—SHEET 2.
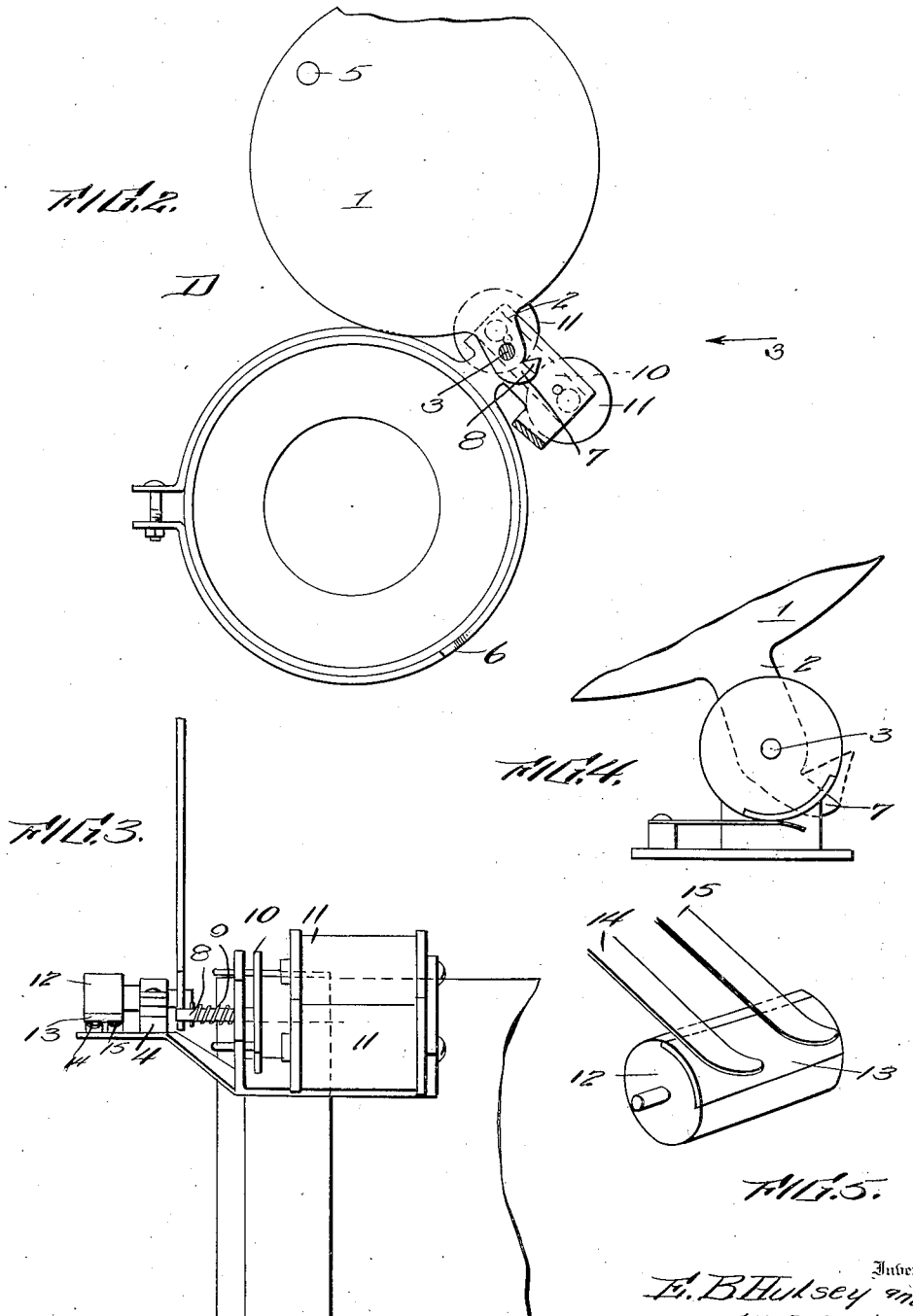

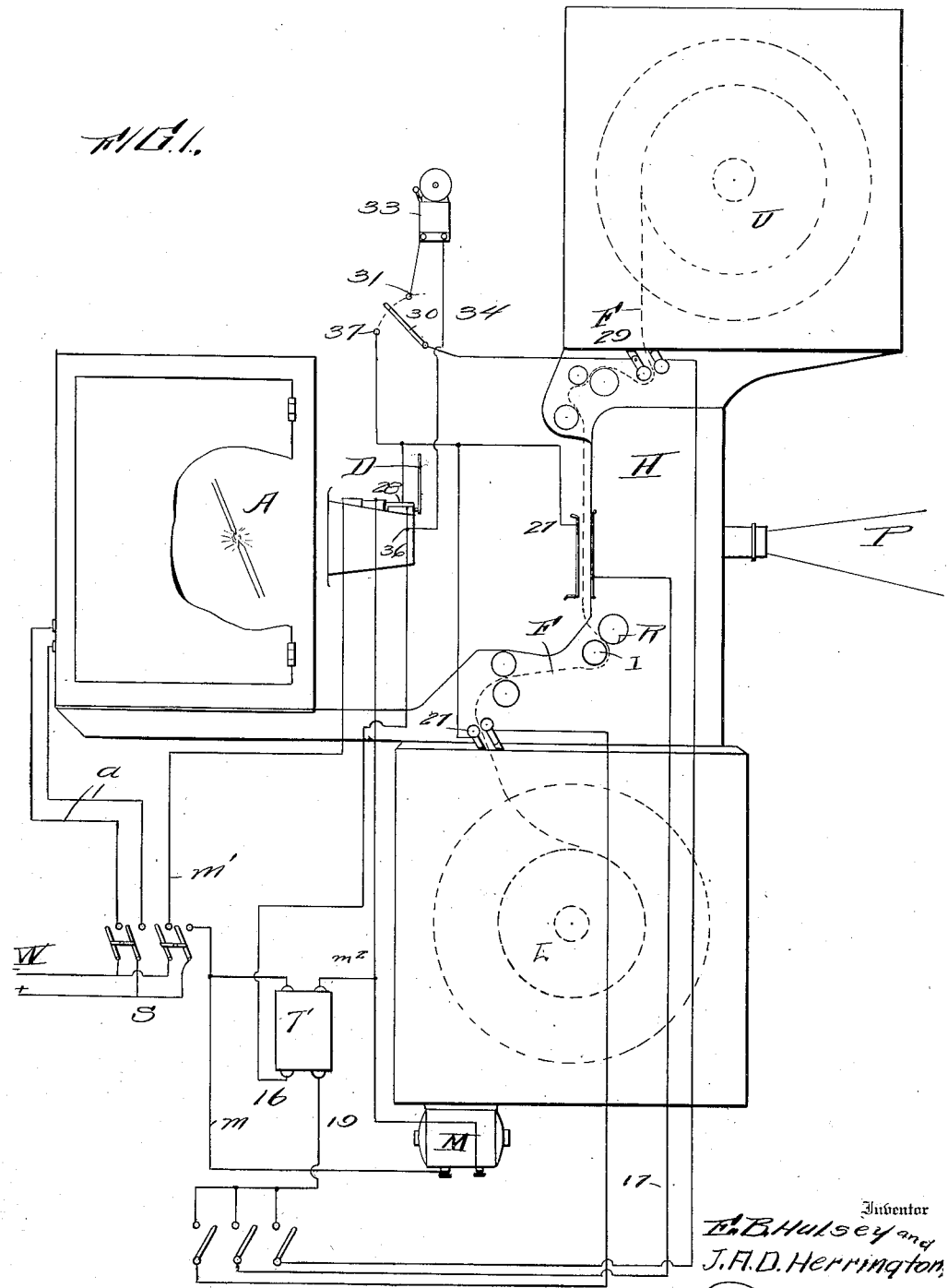

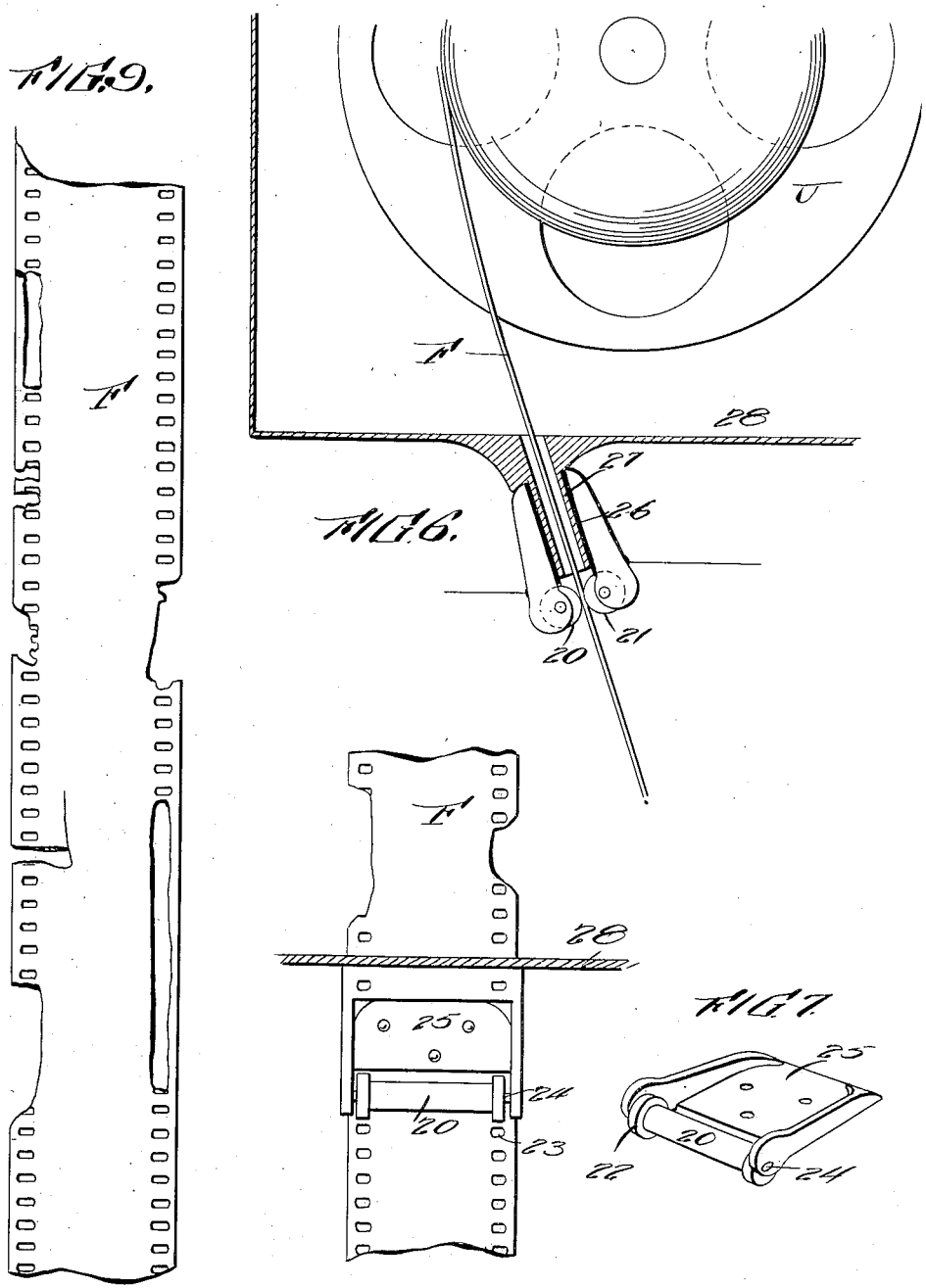

UNITED STATES PATENT OFFICE.

ELIE B. HULSEY AND JOHN A. D. HERRINGTON, OF TUPELO, MISSISSIPPI.

STOP-MOTION FOR MOTION-PICTURE MACHINES.

1,243,067.  Specification of Letters Patent.  Patented Oct. 16, 1917.

Application filed June 1, 1916. Serial No. 101,198.

*To all whom it may concern:*

Be it known that we, ELIE B. HULSEY and JOHN A. D. HERRINGTON, citizens of the United States, residing at Tupelo, in the county of Lee and State of Mississippi, have invented certain new and useful Improvements in Stop-Motions for Motion-Picture Machines; and we do hereby declare the following to be a full, clear, and exact description of the invention, such as will enable others skilled in the art to which it appertains to make and use the same.

This invention relates to motion picture apparatus, and more especially to stop motion devices actuated by a defective or torn picture-strip; and the object of the same is to provide mechanism by means of which such a defect or break in the strip at any of several points will trip the catch which holds the dowser raised, and the fall of the latter will not only interpose a shutter between the lamp box and all other mechanism but will also shut off all current except that flowing to the lamp. A further object of the invention is the provision of means for cutting out the circuit closers at any of several points, and for cutting in an alarm at one of them, for a purpose yet to appear. The following specification sets forth the preferred manner of carrying out this invention, reference being had to the drawings wherein:—

Figure 1 is a diagrammatic elevation of a motion picture apparatus complete, showing the arrangement of parts in this invention and the wiring employed.

Fig. 2 is a front elevation of the dowser and the catch for supporting it, and Fig. 3 an edge view thereof taken from the point indicated by the arrow in Fig. 2.

Fig. 4 is an enlarged detail of the circuit breaker which is actuated by the shaft of the dowser, and Fig. 5 a perspective detail of the same from below.

Fig. 6 is an edge view of one of the circuit closers, Fig. 7 a perspective view of one element or contact thereof, and Fig. 8 a plan view showing a piece of the film passing through the circuit closer; while Fig. 9 is a plan view of a defective film such as is sometimes supplied to the operator but which may yet be used successfully by employing this invention.

Commercial films often come to the operator in bad order, sometimes with considerable pieces gone from their margins as shown in Fig. 9 but yet not sufficiently defective to seriously interfere with the projection of a proper picture so long as the film does not break off completely. When the defect is not too serious it is desirable that an alarm be given the operator before the defect reaches the line of projection, and this invention provides such an alarm with means for cutting it out when it is not used. When the film breaks either as it passes out of the box containing the upper reel or as it passes the head of the machine, the apparatus must be stopped and the film repaired before it is wound on the lower reel; and this invention provides circuit closers for accomplishing this, together with means for cutting out either when it is not desired to have them work. Also a third circuit closer is provided at the entrance to the box of the lower reel, useful for the same purpose and having its own cut-out. The light in the lamp box, whether an arc light or otherwise, should not be allowed to cool for a moment because if so it requires several minutes for it to heat up again, and after a broken film has been repaired time is lost before the apparatus can be started up. By this invention the shutting off of the motor and stopping of the travel of the film through the closing of any contact drops the dowser without extinguishing the light, allowing the latter to burn while repairs are being made and permitting such repairs without the flow of any current except on the wires which lead to the lamp. When operation is to be resumed, resetting the dowser automatically closes the motor circuit at the moment it opens the lamp box.

It will not be necessary to go into details as to the construction of a motion picture apparatus, and therefore the same is shown diagrammatically only in Fig. 1 and it will be described in outline as follows: The line wires W from a suitable source of electricity are branched through two switches at S, one switch controlling circuit $a$ leading into the light box and to the light which is usually an arc lamp A. The other switch controls a circuit, one wire $m$ of which leads to one side of an electric motor M and is branched to one side of a transformer T, while the other wire $m'$ thereof leads through a circuit breaker controlled by the movements of the dowser D, and thence at $m^2$ to the other side of the motor and transformer. From the latter leads a low voltage circuit which is carried to the several circuit closers described hereinafter in detail. The film F passes from the upper reel U first through one of said circuit closers, thence past the head H of the machine across the line of light from the lamp to the screen, and thence into the casing of the lower reel L; and throughout this course the film passes between rollers R and idlers I, the former being driven by connection with the motor in a manner well known and not necessary to illustrate. It will be seen that the dowser when raised as shown in Fig. 1 permits light from the lamp A to pass through the film, and its rays to be projected as at P onto the screen which is not shown.

Coming now to the details of the present invention, the dowser D best seen in Fig. 2 consists of a disk or shutter 1 having a radial arm 2 fixed on a shaft 3 which is mounted in bearings 4 so located with respect to the line of light from the lamp A that when the dowser is raised by its knob or handle 5 the light shines through the apparatus and the picture is projected, but when the dowser falls against the stop 6 the light is cut off. For holding it in raised position, said arm has a projection 7 engaged by the tip of a bolt 8 forming part of the catch mechanism best seen in Fig. 3, and projected into operative position by means of spring 9. This bolt carries an armature 10 standing near an electromagnet 11, and when the latter is energized the bolt is retracted to permit the dowser to fall. The shaft 3 also carries a circuit breaker best seen in Figs. 4 and 5, and the same consists of a roller of fiber or other insulating material, 12, having a metal plate 13 inset into it at one side; and against this roller bear two fingers 14 and 15 which are electrically connected by the plate 13 when the dowser rises and the roller carries said plate downward as seen in Fig. 4. This circuit breaker is inserted between the main switch and the motor, one of its fingers 14 being connected with the wire $m'$ and the other finger 15 with the wire $m^2$ as diagrammatically shown in Fig. 1.

For energizing the magnet 11 to actuate the catch and release the dowser, a circuit is led along the wire 16 from the transformer, through the magnet, and thence from the magnet through a plurality of circuit closers (three of which are shown herein) and from the latter along individual wires 17 and through individual switches 18 to a wire 19, and back to the transformer. It will be obvious that when any switch 18 is opened, its circuit closer is thrown out of action. These circuit closers, as above suggested, are preferably placed at the outlet of the box containing the upper reel U, at the inlet of the box containing the lower reel L, and on the head H just at the point of exposure, but the construction of all of them is substantially alike as best seen in Figs. 6, 7 and 8. Rollers 20 and 21 are permanently magnetized and have their ends enlarged into collars 22 spaced so as to travel on the perforated margins 23 of the film F, and their trunnions 24 journaled in bearings in metal leaves 25 which are mounted upon but insulated as at 26 from the outlet 27 from the reel box 28 as seen in Fig. 6, or could be appropriately supported by and insulated from the head H in a manner not necessary to illustrate. As long as the film traveling between these rollers is perfect, their collars do not contact, but when a considerable break occurs in either margin as seen in Fig. 9 two of the collars will contact and a circuit will be closed through wires connected with the respective leaves 25. Each of the individual wires 17 is connected with one leaf of the respective circuit closers. The other leaves of all of them but the uppermost are connected by wires 27 with one side of the magnet 11 at the point 28, and the other side of said magnet is connected by the wire 16 with the transformer T. But from the uppermost circuit closer a wire 29 leads to the arm of a switch 30, and from one contact 31 of the latter a wire 32 leads through an alarm such as a bell 33, and thence along a wire 34 to the point 36 beyond the magnet 11, where it is united with the wire 16; whereas the other contact 37 of said switch is connected directly with the wire 27 described above. When the arm 30 is closed on this contact, the bell is cut out and the uppermost circuit closer will actuate the magnet like the others, but when the arm 30 is closed on the contact 31 the bell is cut into circuit and the magnet 11 is cut out, and therefore this circuit closer will sound an alarm without energizing the magnet and dropping the dowser. Of course neither of these actions takes place unless the proper individual switch 18 is closed, and in fact all of the stations may be selectively thrown into or out of action by these switches.

When now this invention is applied to a moving picture apparatus and all switches shown in Fig. 1 are closed, the lamp burns at A, the motor M runs and the film F is fed from the reel U through the head H to the reel L, and the picture is projected at P—the action of the shutter being immaterial to the present invention. With the switch arm 30 on the contact 31, when a tear in one margin of the film passes between the collars 22 of the uppermost circuit closer or station, a circuit is closed from the transformer through the bell but not through the magnet 11, and an alarm is sounded—thus giving the operator notice that a defect in but not necessarily a complete break of the film is approaching the lens. Instantly he closes the proper switches 18 so that this defect will not close a circuit from either of the other stations, because the result would be what is described below. If the switch arm 30 is on the point 37, however, when such defect passes the uppermost station a circuit will be closed through the magnet 11 and the bolt of the catch will be retracted to permit the dowser to drop; and this also will occur when such defect passes any station, so long as the latter is in action by the close of its respective switch 18. Falling of the dowser turns the roller 12 and breaks the circuit $m'$, $m^2$ which normally stands closed as seen in Fig. 4, and therefore current is shut off immediately from the motor and the transformer, or in other words from all parts of the apparatus excepting the lamp, while the latter continues to burn behind the dowser. This gives the operator the chance to slip a defective place in the film past the lens, or to repair a broken film, for it will be obvious that a complete break of the film will effect a closing of the circuit at any station in the manner above described. He then grasps the knob 5 and raises the shutter of the dowser, and immediately the circuit breaker is closed, the circuit through the motor and transformer restored, and the apparatus resumes its motion—the light now shining through the film because the dowser is raised. It is thought it will hardly ever be necessary to provide more than three stations, although the right to do so if preferred is reserved. Proper care of the film, especially if it be rented, demands that it be repaired—even if it should break after it has passed the head H—and therefore it is preferred to have a station at the inlet of the lower reel L. In fact, this is necessary in order that this reel shall wind up the film, because it is rare that an operator can force a broken film into said inlet and cause it to be taken up by the rotating reel. Another station is obviously necessary in the head H and immediately in advance of the line of light. The station at the outlet of the casing of the upper reel U is useful more in moving picture houses which rent commercial films which are sometimes furnished them in rather bad condition, yet it has been shown how the switch 30 may be employed to cause the circuit closer at this station to either give an alarm or to stop the machine as desired. More than three stations would hardly perform any additional function, and therefore would find little use. Finally, any station may be thrown out of work at any moment by manipulation of the proper individual switch 18.

What is claimed as new is:

1. In a motion picture apparatus, the combination with a dowser interposed between the light and head, a catch for holding the dowser shutter open, a motor and its circuit, and means for breaking said circuit by the close of the dowser; of a circuit closer between the head and feed reel kept normally open by the film and closed by a break thereof or a tear therein, an electromagnet for actuating the catch to release said dowser, an alarm, a circuit from the circuit closer to the magnet and branched to the alarm, and a switch at the point of branching, for the purpose set forth.

2. The combination with a motion picture apparatus, an automatically closing dowser, and a catch for holding it open; of a circuit breaker closed while the dowser is opened and opened by the close of the dowser, a lamp, a circuit leading thereto, a motor, a branch from the lamp circuit leading through said circuit breaker to the motor, an electromagnet for retracting said catch, a plurality of circuit closers along the line of the film and closed by a break therein or the passage of a tear therethrough, the first of said circuit closers being adjacent the feed reel, circuits from such circuit closers to said electromagnet, a switch in the circuit from said closer adjacent the feed reel and an alarm and circuit selectively closed by the movement of the switch to cut out the magnet and cut in the alarm, for the purpose set forth.

3. The combination with a motion picture apparatus, an automatically closing dowser, and a catch for holding it open; of a circuit breaker closed while the dowser is opened and opened by the close of the dowser, a lamp, a circuit leading thereto, a motor, a branch from the lamp circuit leading through said circuit breaker to the motor, an electromagnet for retracting said catch, a plurality of circuit closers along the line of the film and closed by a break therein or the passage of a tear therethrough, and circuits from said closers to the electromagnet.

4. The combination with a motion picture apparatus, a dowser, mechanism for holding it raised, and an electromagnet for tripping said mechanism; of a circuit for actuating said magnet, and a circuit closer in said circuit comprising a pair of leaves mounted on and insulated from a support, rollers carried by said leaves at opposite sides of the film, and collars near the ends of the rollers traveling on the margins of the film and adapted to make contact when either margin is torn.

5. The combination with a motion picture apparatus, a dowser including a shutter having an arm mounted on a shaft, a bearing in which said shaft is journaled, a catch having a normally projected bolt engaging said arm to hold the shutter raised, and means for retracting said bolt when a defect in the film approaches the head of the apparatus; of a motor for driving the film, a motor circuit, and a circuit breaker therein comprising an insulated roller mounted on said shaft and having a plate along one side, and fingers connected to the circuit and so disposed as to make contact with said plate when the dowser shutter stands raised.

In testimony whereof we affix our signatures.

ELIE B. HULSEY.
JOHN A. D. HERRINGTON.